US008994612B2

(12) United States Patent
Fujishiro

(10) Patent No.: US 8,994,612 B2
(45) Date of Patent: Mar. 31, 2015

(54) VIRTUAL IMAGE DISPLAY SYSTEM

(75) Inventor: Takeshi Fujishiro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 337 days.

(21) Appl. No.: 13/344,819

(22) Filed: Jan. 6, 2012

(65) Prior Publication Data

US 2012/0200477 A1    Aug. 9, 2012

(30) Foreign Application Priority Data

Feb. 4, 2011  (JP) .................................. 2011-022229

(51) Int. Cl.
*G09G 5/00*  (2006.01)
*G02C 5/22*  (2006.01)
*G02B 27/01*  (2006.01)
*G02B 6/00*  (2006.01)

(52) U.S. Cl.
CPC .............. *G02B 27/0172* (2013.01); *G02C 5/22* (2013.01); *G02B 27/0176* (2013.01); *G02B 6/00* (2013.01); *G02B 2027/0178* (2013.01)
USPC .............................................. 345/8; 351/153

(58) Field of Classification Search
None
See application file for complete search history.

(56) References Cited

U.S. PATENT DOCUMENTS

| 2002/0163486 | A1  | 11/2002 | Ronzani et al. |
| 2007/0070854 | A1  | 3/2007 | Kim |
| 2007/0070859 | A1* | 3/2007 | Hirayama ................ 369/112.04 |
| 2008/0122736 | A1* | 5/2008 | Ronzani et al. .................... 345/8 |
| 2008/0212016 | A1* | 9/2008 | Maling .......................... 351/116 |
| 2008/0266517 | A1* | 10/2008 | Reane ............................ 351/153 |
| 2009/0141501 | A1  | 6/2009 | Mukawa |
| 2009/0180194 | A1  | 7/2009 | Yamaguchi et al. |
| 2010/0245211 | A1* | 9/2010 | Iba et al. ............................ 345/8 |
| 2011/0032706 | A1  | 2/2011 | Mukawa |
| 2011/0096288 | A1* | 4/2011 | LaGace et al. ................ 351/153 |
| 2012/0078628 | A1* | 3/2012 | Ghulman ..................... 704/235 |
| 2012/0287374 | A1  | 11/2012 | Mukawa |

FOREIGN PATENT DOCUMENTS

| CN | 101446684 A | 6/2009 |
| JP | H09-504120 A | 4/1997 |
| JP | A-10-301055 | 11/1998 |
| JP | A-2006-162767 | 6/2009 |
| WO | 95-11473 A1 | 4/1995 |
| WO | 2007/037089 A1 | 4/2007 |

\* cited by examiner

*Primary Examiner* — Dwayne Bost
*Assistant Examiner* — Maheen Javed
(74) *Attorney, Agent, or Firm* — Oliff PLC

(57) ABSTRACT

A virtual image display system includes a display device outputting image light, a circuit substrate driving the display device based on an image signal, a signal line connected to the circuit substrate and inputting the external image signal to the circuit substrate, a projection optical device projecting the image light from the display device, a light guide plate taking in the projected image light, and then, guiding the light to an external predetermined position, a housing member having a housing space housing respective members, and a first space communicated with the housing space and housing a part of the signal line inside, and a temple rotatably attached to the housing member via a hinge mechanism and having a second space communicated with the first space via the hinge mechanism inside. The signal line is routed from the first space into the second space via the hinge mechanism.

6 Claims, 9 Drawing Sheets

VIRTUAL IMAGE DISPLAY SYSTEM

BACKGROUND

1. Technical Field

The present invention relates to a virtual image display system such as a head-mounted display mounted on a head of an observer.

2. Related Art

In related art, a virtual image display system (image display system) having an appearance of eyeglasses for an observer to observe an image formed by a display device such as an LCD (Liquid Crystal Display) as a virtual image using an optical system has been proposed (for example, see Patent Document 1 (JP-A-2006-162767)).

The virtual image display system disclosed in Patent Document 1 includes an image display unit having a display device (LCD or the like), a drive circuit, a projection lens (objective lens), etc. and fixed to a temple of an eyeglass frame, and a light guide plate (substrate) fixed to the front of the eyeglass frame.

The image display unit (drive circuit) inputs a signal from outside via a cable (signal line) and allows the display device to form image light.

On the light guide plate, an entrance mirror and a combiner are respectively provided at one end side and the other end side.

The entrance mirror reflects the image light output from the display device and projected by the projection lens as parallel light so that the image light may be totally reflected within the light guide plate and guided to the combiner.

Then, the combiner reflects the image light guided by the total reflection within the light guide plate and guides it to a predetermined position (the left eye or the right eye of the observer) outside the light guide plate.

In the virtual image display system disclosed in Patent Document 1, the image display unit is fixed in a position close to the light guide plate in the temple. The cable connected to an external device is directly connected to the image display unit fixed in the position in the temple.

That is, there is a problem that, when the observer wears the virtual image display system, the cable is likely to hit the face of the observer and bring a feeling of discomfort to the observer.

SUMMARY

An advantage of some aspects of the invention is to provide a virtual image display system that may improve usability.

A virtual image display system according to an aspect of the invention includes a display device that outputs image light, a circuit substrate that drives the display device based on an image signal, a signal line that is connected to the circuit substrate and inputs the external image signal to the circuit substrate, a projection lens that projects the image light from the display device, a light guide plate that takes in the image light from the projection lens, and then, guides the light to an external predetermined position, a housing member having a housing space that houses the display device, the circuit substrate, and the projection lens, and a first space communicated with the housing space and housing a part of the signal line inside, and a temple rotatably attached to the housing member via a hinge mechanism and having a second space communicated with the first space via the hinge mechanism inside, wherein the signal line is routed from the first space into the second space via the hinge mechanism.

In the aspect of the invention, as described above, the signal line is routed from inside of the housing member (the housing space, the first space) in which the circuit substrate etc. are housed into the temple (the second space) via the hinge mechanism.

According to the configuration, for example, if the signal line routed into the second space is arranged to be led out from the other side opposite to the one side attached to the housing member in the temple to the outside, when the observer wears the virtual image display system, the signal line does not hit the face of the observer or bring a feeling of discomfort to the observer. That is, usability of the virtual image display system may be improved.

In the virtual image display system according to the aspect of the invention, it is preferable that the light guide plate includes an image lead-in part that is provided to face the projection lens and leads the image light from the projection lens into the light guide plate, a total reflection part that has a pair of total reflection surfaces formed in flat shapes orthogonal to an optical axis of the projection lens in parallel to each other, and guides the image light that has been led into the light guide plate in a direction away from the image lead-in part by total reflection on the pair of total reflection surfaces, and an image lead-out part that leads the image light that has been guided by the total reflection part to the external predetermined position.

In the aspect of the invention, since the light guide plate includes the above-described image lead-in part, total reflection part, and image lead-out part, the observer may observe not only the images formed on the display device but also external images, and a see-through virtual image display system may be formed.

In the virtual image display system according to the aspect of the invention, it is preferable that the part of the signal line is bent by elastic deformation and housed in the first space.

The temple is rotatably attached to the housing member via the hinge mechanism. Accordingly, when the temple is rotated, a load tends to be applied on the signal line in the part located in the connection position between the housing member and the temple and disconnection may occur in the signal line.

In the aspect of the invention, since the part of the signal line is bent by elastic deformation and housed in the first space, the load applied on the signal line in response to the rotation of the temple may be reduced by the bending of the signal line and disconnection of the signal line may be prevented in good condition.

In the virtual image display system according to the aspect of the invention, it is preferable that the part of the signal line is bent in a U shape by elastic deformation and housed in the first space, and the U-shaped part rotates in the first space with the rotation of the temple via the hinge mechanism with respect to the housing member.

When the part of the signal line housed in the first space is bent in the U shape by elastic deformation as described above, the U-shaped part easily rotates with the rotation of the temple.

In the aspect of the invention, the U-shaped part is arranged to rotate in the first space with the rotation of the temple. In other words, the first space is set to a size that may allow rotation without restriction of the rotation due to mechanical interference with the inner surface of the housing member or the like when the U-shaped part rotates with the rotation of the temple.

Accordingly, when the temple rotates, the rotation of the U-shaped part is not restricted by the inner surface of the housing member or the like or no load is applied on the signal line, and disconnection of the signal line may be prevented in better condition.

In the virtual image display system according to the aspect of the invention, it is preferable that the circuit substrate is provided at one of an upper side and a lower side with respect to the display device and the projection lens within the housing space, and the signal line is routed from the first space toward the second space via the one side in the hinge mechanism.

For example, if the circuit substrate is provided at the upper side with respect to the display device and the projection lens and the signal line is routed from the first space toward the second space via the lower side in the hinge mechanism, the following defects may be caused.

That is, if the part of the signal line is bent in the U shape by elastic deformation and housed in the first space as described above, the U-shaped part is obliquely distorted.

Under the condition that the U-shaped part is obliquely distorted, it is easy for the part to mechanically interfere with the inner surface of the housing member or the like, and it is necessary to set the first space to an unnecessarily large space. That is, the housing member may be larger, and thus, the virtual image display system may be larger.

In the aspect of the invention, the position where the circuit substrate is located and the position where the signal line passes through the hinge mechanism are set at one of the upper side and the lower side.

According to the configuration, oblique distortion of the U-shaped part may be prevented.

That is, it is hard for the U-shaped part to mechanically interfere with the inner surface of the housing member or the like, it is not necessary to set the first space to the unnecessarily large space, and housing member and the virtual image display system may be downsized.

Further, since the part of the signal line housed in the first space is bent and bowed in the vertical directions by elastic deformation, oblique distortion under its own weight may be prevented and the configuration that is hard to mechanically interfere with the inner surface of the housing member or the like may be realized.

In the virtual image display system according to the aspect of the invention, it is preferable that the hinge mechanism includes a rotational shaft that rotates the temple with respect to the housing member, a support part that is provided in the housing member and supports the rotational shaft, a journal part that is provided in the temple, has an insertion hole into which the rotational shaft is inserted, and is rotatably journaled by the rotational shaft, and an urging member bridged between the rotational shaft and the temple and urges the temple in a direction closer to the rotational shaft, wherein a first contact part and a second contact part that are contacted each other when the temple is rotated against an urging force of the urging member are provided in the housing member and the temple, respectively, and the insertion hole includes a track hole passing through a contact position between the first contact part and the second contact part and extending in a rotation direction around a hypothetical second axis in parallel to the rotational shaft.

In the aspect of the invention, since the hinge mechanism has the above-described configuration, when the observer wears the virtual image display system, the temple may be pressed toward the head of the observer with a predetermined force using the urging force by the urging member. That is, the temple may be fitted with the head of the observer, and a feeling at the time when the observer wears the virtual image display system may be improved.

Further, since the hinge mechanism has the above-described configuration, the temple may rotate around the above-described second axis in addition to the above-described rotation around the rotational shaft. That is, the rotation angle (rotation range) of the temple is larger.

Even when the rotation angle of the temple is larger as described above, if the part of the signal line housed in the first space is bent by elastic deformation, for example, disconnection of the signal line may be prevented in good condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of the invention will be explained with reference to the drawings.

1. Configuration of Virtual Image Display System

Figure 1:
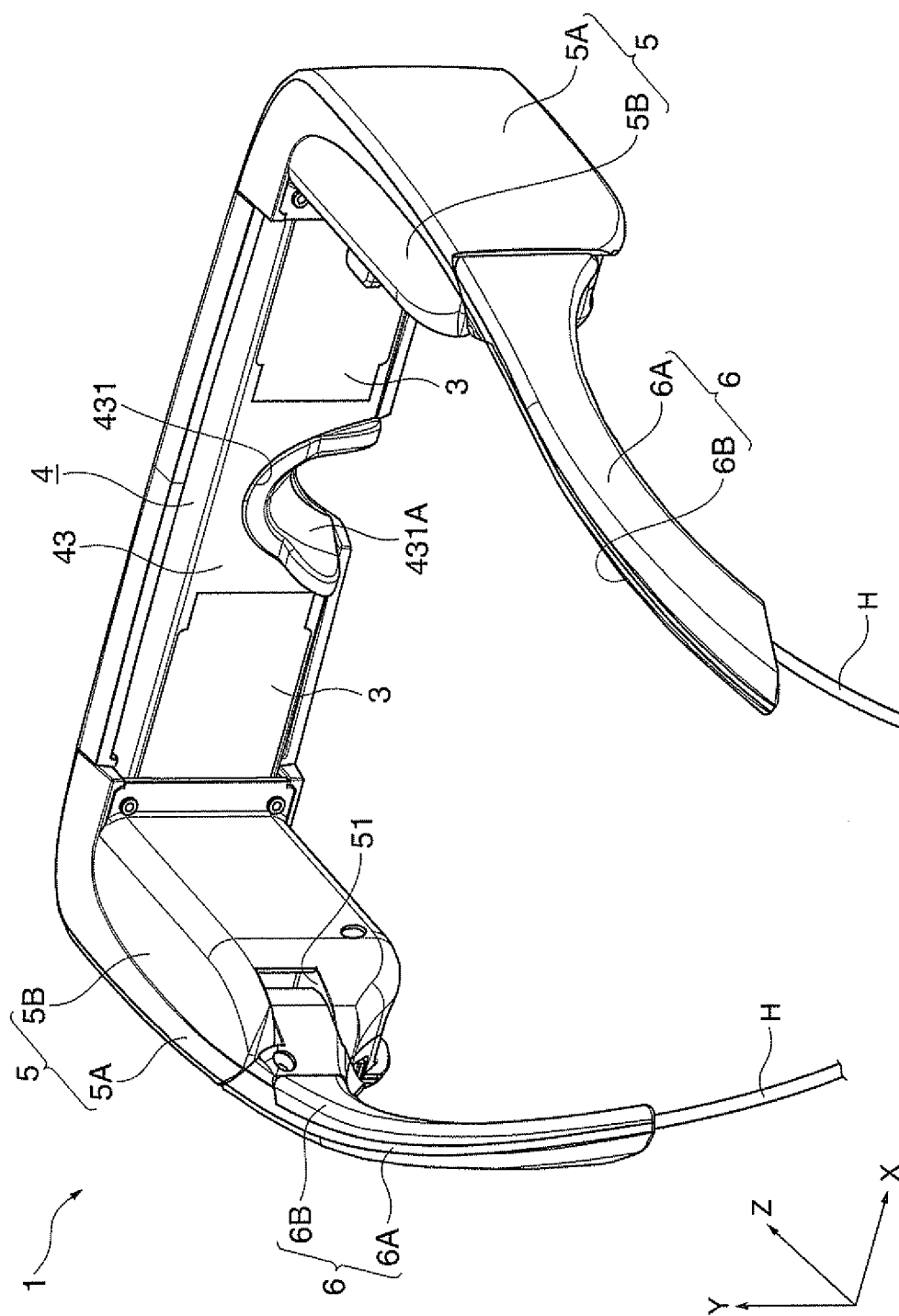
FIG. 1 is a perspective view showing an appearance of a virtual image display system in an embodiment.

FIG. 1 is a perspective view showing an appearance of a virtual image display system 1.

Figure 2:
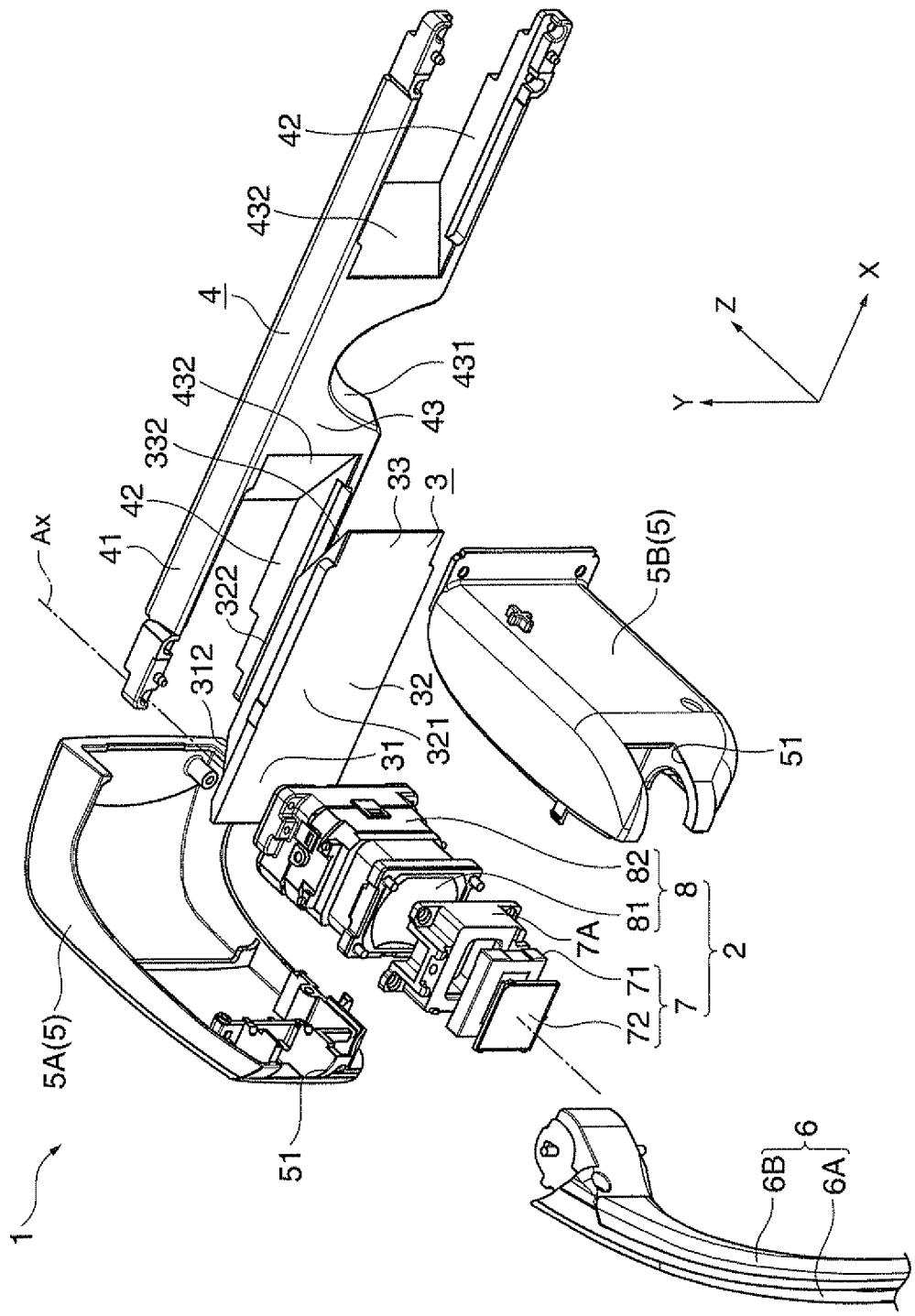
FIG. 2 is an exploded perspective view showing a configuration of the virtual image display system in the embodiment.

FIG. 2 is an exploded perspective view showing a configuration of the virtual image display system 1.

Figure 3:
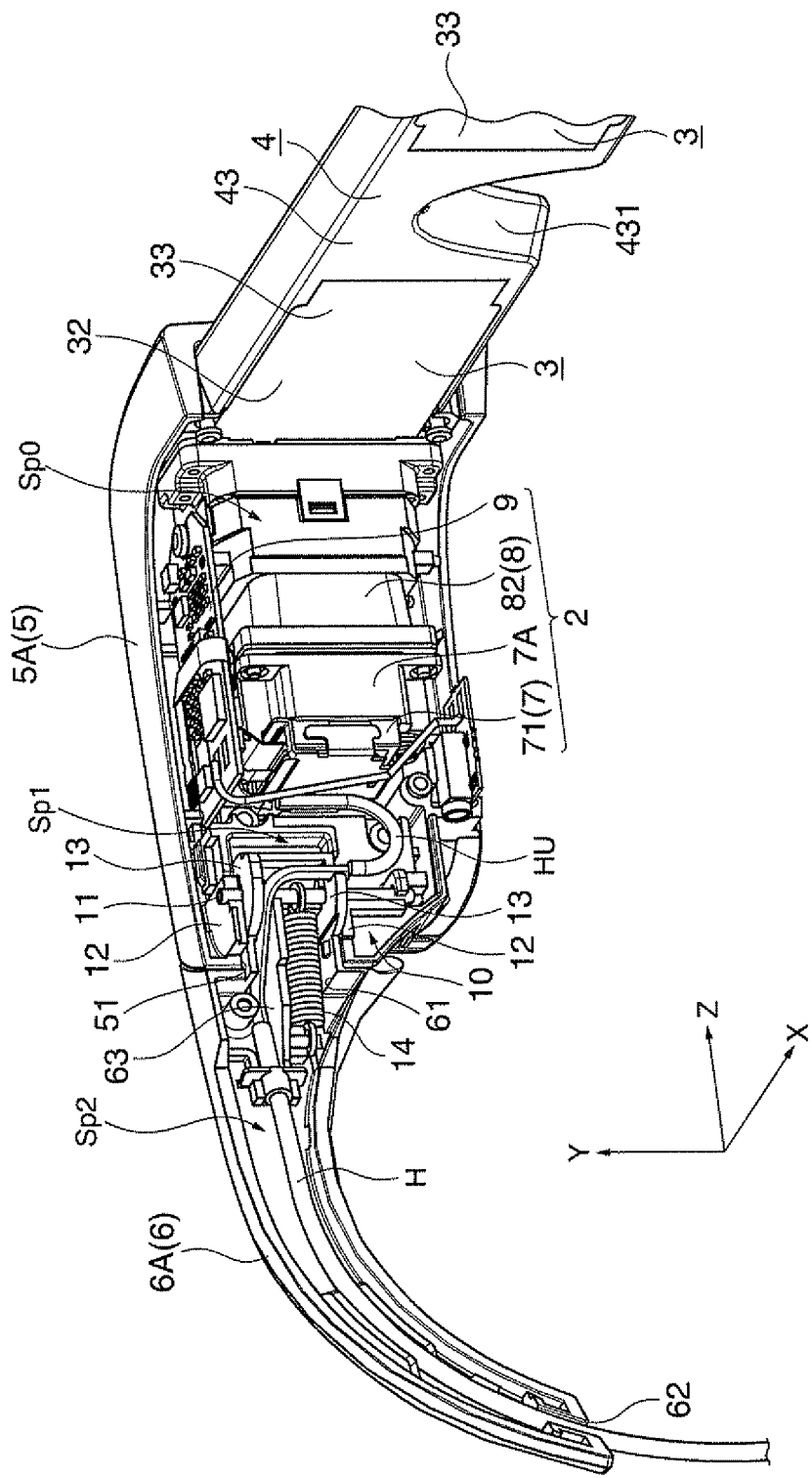
FIG. 3 is a perspective view showing an internal configuration of the virtual image display system in the embodiment.

FIG. 3 is a perspective view showing an internal configuration of the virtual image display system 1.

Note that, in FIGS. 1 to 3, for convenience of explanation, an axis in parallel to an optical axis Ax (FIG. 2) of a projection lens 81, which will be described later, is the Z-axis, and the horizontal axis orthogonal to the Z-axis is the X-axis, the vertical axis orthogonal to the Z-axis is the Y-axis. The same is applicable to the subsequent drawings. Further, regarding the Z-axis, the observer's side is the −Z-axis side and the side away from the observer is the +Z-axis side.

FIGS. 1 to 3 are the views as seen from the −Z-axis side. Further, for convenience of explanation, FIGS. 2 and 3 show only the side corresponding to the left eye of the observer. Furthermore, in FIG. 2, for convenience of explanation, illustration of a circuit substrate 9 and a harness H is omitted.

The virtual image display system 1 is a head-mounted display having an appearance like eyeglasses as shown in FIGS. 1 to 3, and allows an observer wearing the virtual image display system 1 to recognize image light by a virtual image. Further, the virtual image display system 1 of the embodiment includes a see-through virtual image display system for see-through observation of an external image.

The virtual image display system 1 includes image forming units 2 (FIGS. 2 and 3), light guide plates 3, a rim 4, covers 5 as housing members, and temples 6 as shown in FIGS. 1 to 3.

Note that, as shown in FIGS. 1 to 3, the image forming units 2, the light guide plates 3, the covers 5, and the temples 6 are provided in pairs respectively corresponding to the left eye and the right eye of the observer who wears the virtual image display system 1, and placed symmetrically with respect to the YZ plane.

The pair of image forming units 2, the pair of light guide plates 3, the pair of covers 5, and the pair of temples 6 have the same configuration between left and right, and only the side corresponding to the left eye of the observer will be explained.

2. Configuration of Image forming Unit

The image forming unit 2 is a member that forms and projects image light, and includes a display device 7, a projection optical device 8, the circuit substrate 9 (FIG. 3) as shown in FIG. 2 or 3.

As shown in FIG. 2 or 3, the display device 7 includes a transmissive liquid crystal display device 71 that modulates incident light and forms image light, and a backlight 72 (FIG. 2) that is attached to the light-incident side of the liquid crystal display device 71 and outputs light to the liquid crystal display device 71.

As shown in FIG. 2 or 3, the projection optical device 8 includes a projection lens 81 (FIG. 2) that projects image light output from the display device 7 as parallel light, and a lens tube 82 that holds the projection lens 81 inside.

Further, the display device 7 is fixed to an end surface at the −Z-axis side in the lens tube 82 via an attachment member 7A as shown in FIG. 2 or 3.

The circuit substrate 9 has a semiconductor device such as an IC (Integrated Circuit) chip or the like mounted thereon, and drives the liquid crystal display device 71 based on an image signal externally input via the harness H (FIG. 3) as a signal line and allows the liquid crystal display device 71 to form image light based on the image signal.

Further, the circuit substrate 9 is attached to the upper side of the display device 7 and the projection optical device 8 as shown in FIG. 3.

Furthermore, the image forming unit 2 in which the respective members 7 to 9 are integrated is fixed to the rim 4 via the lens tube 82 as shown in FIG. 3.

3. Configuration of Light Guide Plate

Figure 4A:
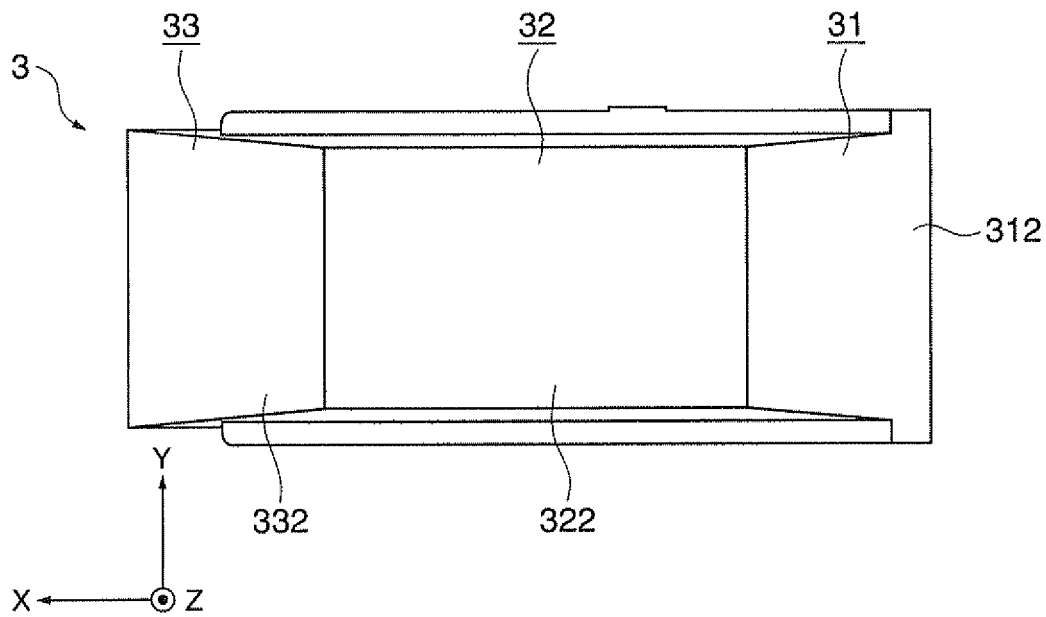
FIG. 4A shows a configuration of a light guide plate in the embodiment when the light guide plate is seen from the +Z-axis side.
Figure 4B:
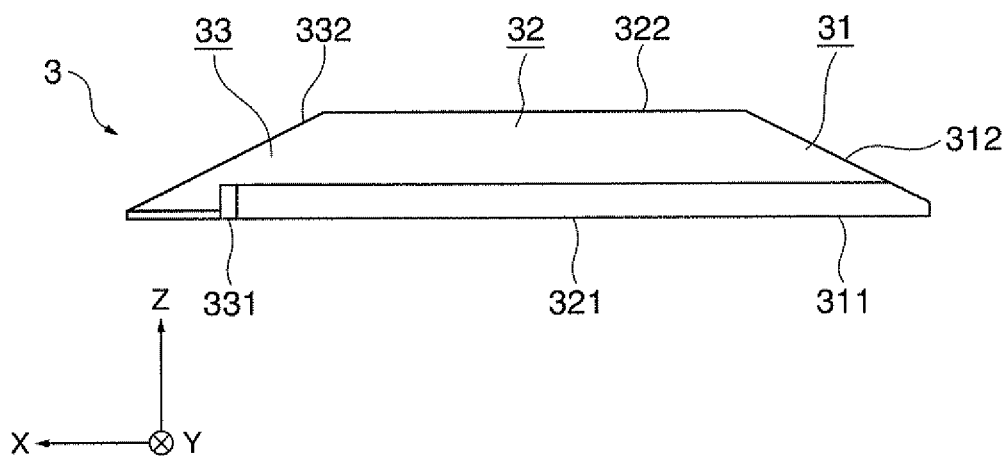
FIG. 4B shows the configuration of the light guide plate in the embodiment when the light guide plate is seen from below along the Y-axis.

FIGS. 4A and 4B show a configuration of the light guide plate 3. Specifically, FIG. 4A shows the light guide plate 3 as seen from the +Z-axis side, and FIG. 4B shows the light guide plate 3 as seen from below along the Y-axis.

The light guide plate 3 is formed by a resin material having light-transmissivity, and takes in the image light projected from the image forming unit 2, and then, guides it to an external predetermined position (the left eye or the right eye of the observer).

As shown in FIG. 2 or FIGS. 4A and 4B, the light guide plate 3 includes an image lead-in part 31, a total reflection part 32, an image lead-out part 33 integrally formed, and is formed nearly in an isosceles trapezoid as seen from the direction along the Y-axis.

As shown in FIG. 2 or FIGS. 4A and 4B, the image lead-in part 31 is formed nearly in a triangular prism shape extending along the Y-axis and located at the side away from the other light guide plate 3 in the assembled virtual image display system 1.

The image lead-in part 31 is provided to face the projection optical device 8 in the assembled virtual image display system 1, and leads the image light projected from the projection optical device 8 into the light guide plate 3.

As shown in FIGS. 4A and 4B, a light-incident surface 311 and a first reflection surface 312 are formed on the outer surface of the image lead-in part 31.

The light-incident surface 311 is a surface formed in a flat shape in parallel to the XY plane and opposed to the projection lens 81. The image light projected from the projection lens 81 enters the surface.

The first reflection surface 312 is opposed to the light-incident surface 311 and formed by deposition such as aluminum evaporation on the flat slope inclined with respect to the XY plane, and reflects the image light that has been led into the image lead-in part 31 via the light-incident surface 311 toward the total reflection part 32.

As shown in FIG. 2 or FIGS. 4A and 4B, the total reflection part 32 has a rectangular plate shape extending along the XY plane and is integrally formed with the image lead-in part 31.

Further, as shown in FIGS. 4A and 4B, the total reflection part 32 has first and second total reflection surfaces 321, 322, and guides the image light reflected on the first reflection surface 312 in the direction away from the image lead-in part 31 (toward the side closer to the other light guide plate 3) by total reflection on the first and second total reflection surfaces 321, 322.

The first total reflection surface 321 is formed by a surface as an extension of the light-incident surface 311 (in parallel to the XX plane (orthogonal to the optical axis Ax)), and located at the −Z-axis side.

The second total reflection surface 322 is formed in a flat shape in parallel to the first total reflection surface 321, and located at the +Z-axis side.

Note that the first and second total reflection surfaces 321, 322 not only include surfaces that totally reflect and guide the image light by interfaces between air and themselves without mirrors, half-mirrors, or the like formed thereon but also use reflection by mirror coatings, half-mirror films, or the like formed on the entire or parts of the first and second total reflection surfaces 321, 322. For example, the case where the incident angle of the image light satisfies the total reflection condition and mirror coatings or the like are formed on the entire or parts of the first and second total reflection surfaces 321, 322 and all of the image light is substantially reflected may be included. Further, as long as image light with sufficient brightness is obtained, the entire or parts of the first and second total reflection surfaces 321, 322 may be coated with mirrors with some transmissivity.

As shown in FIG. 2 or 4A and 4B, the image lead-out part 33 has a nearly triangular prism shape extending in the Y-axis like the image lead-in part 31, and is integrally formed with the total reflection part 32 and located at the side closer to the other light guide plate 3 in the assembled virtual image display system 1.

Further, the image lead-out part 33 leads the image light that has been guided by the total reflection part 32 to the external predetermined position (the left eye or the right eye of the observer) by reflection.

On the outer surface of the image lead-out part 33, as shown in FIGS. 4A and 4B, a light-exiting surface 331 and a second reflection surface 332 are formed.

The light-exiting surface 331 is formed by a surface as an extension of the first total reflection surface 321.

The second reflection surface 332 is opposed to the light-exiting surface 331 and formed in a flat shape inclined with respect to the XY plane, and guides the image light that has been guided by the total reflection part 32 to the external predetermined position (the left eye or the right eye of the observer) by reflection.

The second reflection surface 332 includes a half-mirror or the like, and is adapted to reflect the image light and transmit an external image.

Note that, as the image lead-out part 33, as long as it has a function of guiding the image light that has been guided by the total reflection part 32 to the external predetermined position, not limited to the second reflection surface 332 of the half-mirror or the like, but a polarization beam splitter, a hologram diffraction grating, or the like may be employed.

4. Configuration of Rim

The rim 4 is formed by a resin material having light-transmissivity or the like, has a horizontally symmetric shape, and holds (integrates) the pair of light guide plates 3 with the image lead-out parts 33 of the pair of light guide plates 3 close to each other.

As shown in FIG. 2, the rim 4 includes an upper frame part 41, a pair of lower frame parts 42, and a bridge part 43 integrally formed.

The upper frame part 41 is a member having a section nearly in a rectangular shape extending along the X-axis, and supports the upper sides of the pair of light guide plates 3.

The pair of lower frame parts 42 are members having sections nearly in rectangular shapes extending along the X-axis, provided at the lower side with respect to the upper frame part 41, arranged in parallel along the X-axis, and supports the lower sides of the pair of light guide plates 3.

Further, the image forming unit 2 with the respective members 7 to 9 integrated is fixed to the upper frame part 41 and the lower frame part 42 via the lens tube 82.

A bridge part 43 is located at the center of the rim 4 and bridged between the upper frame part 41 and the pair of lower frame parts 42.

In the bridge part 43, as shown in FIGS. 1 to 3, a cutout part 431 cut out nearly in an arc shape as seen from the direction along the Z-axis from between the pair of lower frame parts 42 to the upper sides.

Further, a nose pad 431A (FIG. 1) in contact with the nose of the observer when the observer wears the virtual image display system 1 is detachably attached to the cutout part 431.

Furthermore, as shown in FIG. 2, slopes 432 according to the respective second reflection surfaces 332 in the pair of light guide plates 3 are respectively formed on the left and right ends at the −Z-axis side in the bridge part 43.

In addition, the light guide plates 3 are fitted to fill the C-shaped inner parts surrounded by the upper frame part 41, the lower frame parts 42, and the bridge part 43, and bonded to the upper frame part 41, the lower frame parts 42, and the slopes 432 via an adhesive.

5. Configuration of Cover

As shown in FIGS. 1 to 3, the cover 5 is formed by combining a first cover part 5A located at the side away from the other cover 5 and a second cover part 5B located at the side closer to the other cover 5, and has a nearly rectangular parallelepiped shape with a hollow interior extending along the Z-axis as a whole.

Further, the cover 5 is fixed to the upper frame part 41 and the lower frame part 42 of the rim 4, and covers the image forming unit 2, a part of the light guide plate 3 (the image lead-in part 31), and a part of the rim 4 (the end sides of the upper frame part 41 and the lower frame part 42).

Furthermore, as shown in FIG. 3, a first space Sp1 is provided inside of the cover 5 in addition to a housing space Sp0 in which the image forming unit 2, the part of the light guide plate 3, and the part of the rim 4 are housed.

The first space Sp1 is communicated with the housing space Sp0 and provided at the −Z-axis side of the housing space Sp0.

Further, in the cover 5, a first attachment hole 51 that communicates the outside with the first space Sp1 is formed nearly at the center in the direction along the Y-axis at the end of the −Z-axis side as shown in FIGS. 1 to 3.

6. Configuration of Temple

As shown in FIGS. 1 to 3, the temple 6 is formed by combining a first temple part 6A located at the side away from the other temple 6 and a second temple part 6B located at the side closer to the other temple 6, and extends in a curved shape with a hollow interior.

Further, the temple 6 has one end side (the end at the +Z-axis side) rotatably attached to the cover 5 via a hinge mechanism 10, which will be described later, and is caught on an ear of the observer when the observer wears the virtual image display system 1.

Note that the temple 6 of the embodiment is formed to be gently curved downward while extending toward the −Z-axis side from one end side toward the other end side and gently curved toward the side closer to the other temple 6 in the state shown in FIG. 1 (the state in which first and second contact parts 15, 16, which will be described later, are in contact with each other).

That is, the temple 6 has a shape conforming the head of the observer when the observer wears the virtual image display system 1.

Further, in the temple 6, a second attachment hole 61 that communicates the outside with the inside (a second space Sp2 (FIG. 3)) is formed in correspondence with the first attachment hole 51 of the cover 5 nearly at the center in the direction along the Y-axis at one end side as shown in FIG. 3.

Note that the second attachment hole 61 is formed by combining the first and second temple parts 6A, 6B, and FIG. 3 shows only a part of the second attachment hole 61 formed in the first temple part 6A.

Further, the first and second spaces Sp1, Sp2 are communicated with each other via the first attachment hole 51, the hinge mechanism 10, and the second attachment hole 61 when the temple 6 is attached to the cover 5 via the hinge mechanism 10, which will be described later.

Furthermore, in the temple 6, a lead-out hole 62 having nearly the same inner diameter as the outer diameter of the harness H is formed at the lower side of the other end as shown in FIG. 3.

Note that the lead-out hole 62 is formed by combining the first and second temple parts 6A, 6B, and FIG. 3 shows only a part of the lead-out hole 62 formed in the first temple part 6A.

7. Configuration of Hinge Mechanism

Figure 5:
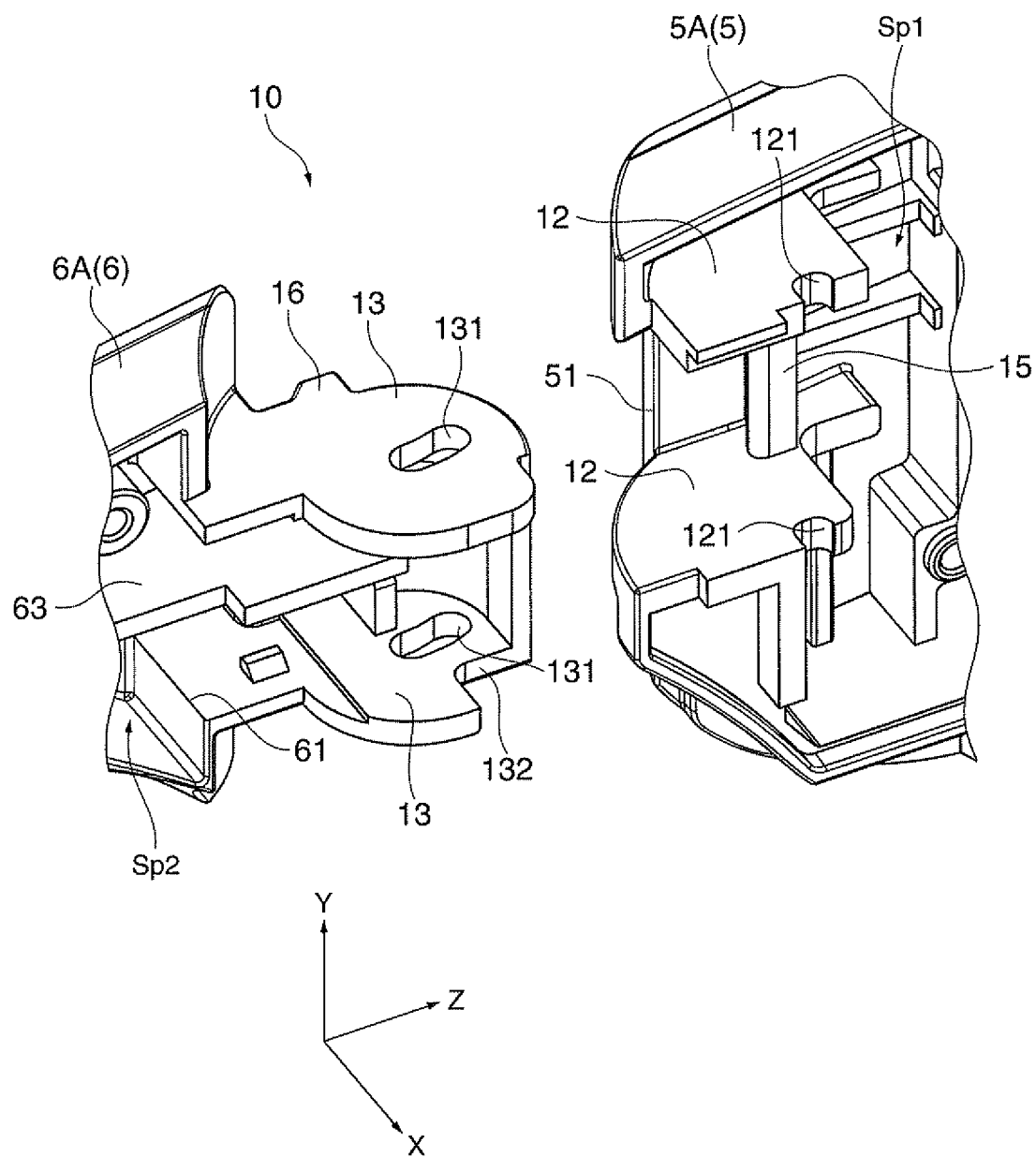
FIG. 5 is an exploded perspective view showing a configuration of a hinge mechanism in the embodiment.

FIG. 5 is an exploded perspective view showing a configuration of the hinge mechanism 10.

As shown in FIG. 3 or 5, the hinge mechanism 10 includes a rotational shaft 11 (FIG. 3), a pair of support parts 12, a pair of journal parts 13, and an urging member 14 (FIG. 3).

The rotational shaft 11 is a shaft formed in a cylindrical shape for rotation of the temple 6 with respect to the cover 5 as shown in FIG. 3.

The pair of support parts 12 are provided in the cover 5 as shown in FIG. 3 or 5.

Specifically, the pair of support parts 12 are formed in plate shapes projecting from the edge part of the first attachment hole 51 in parallel to the XZ plane toward the first space Sp1 and arranged in parallel along the Y-axis in the cover 5.

Further, support holes 121 by which the rotational shaft 11 is supported are respectively formed in the pair of support parts 12 as shown in FIG. 5.

The pair of support parts 12 (support holes 121) are formed by combining the first and second cover parts 5A and 5B, and FIG. 3 or 5 shows only a part of the pair of support parts 12 (support holes 121) formed in the first cover part 5A.

Further, the pair of support parts 12 support the rotational shaft 11 along the Y-axis in the respective support holes 121.

Here, in the first cover part 5A, as shown in FIG. 5, the first contact part 15 is formed to be bridged between the pair of support parts 12 at the side away from the other cover 5 with respect to the support holes 121 as seen from the direction along the Y-axis.

Figure 6A:
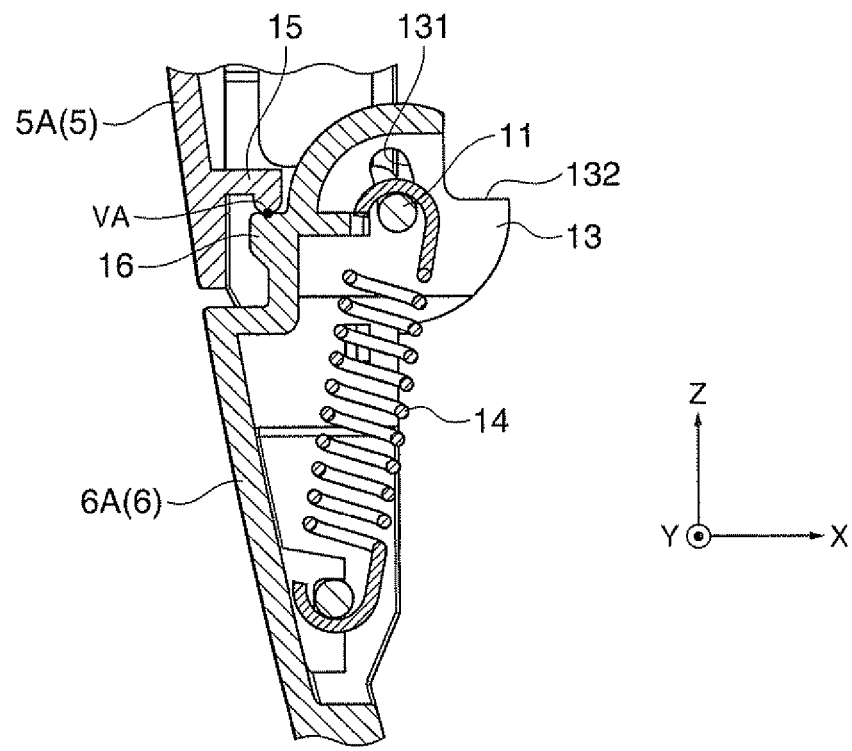
FIG. 6A is a diagram for explanation of a function of an urging member in the embodiment showing a state of the urging member when first and second contact parts are in contact with each other.
Figure 6B:
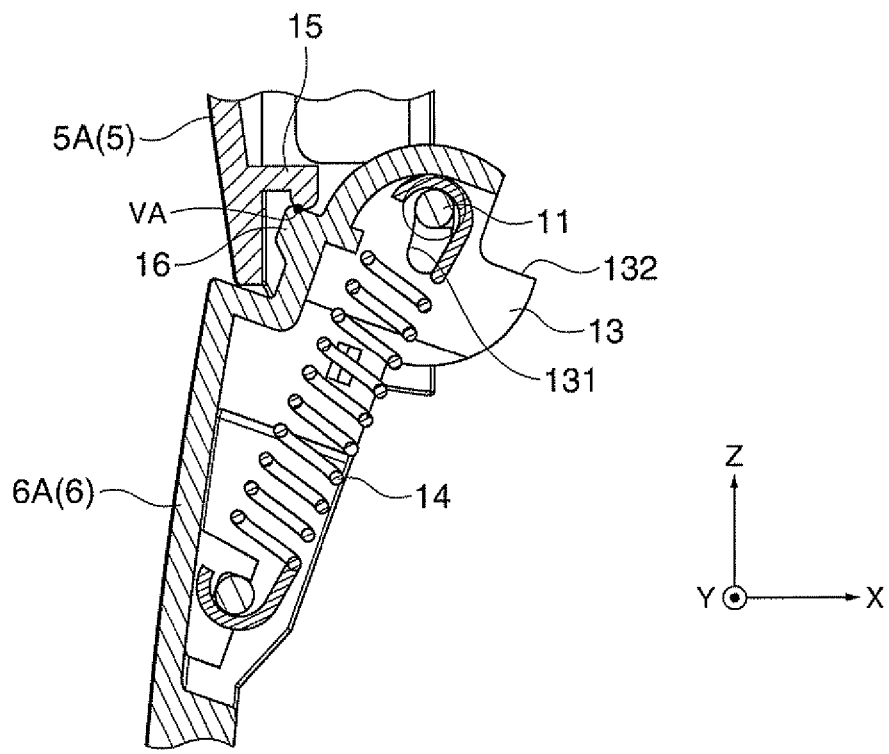
FIG. 6B is a diagram for explanation of the function of the urging member in the embodiment showing a state of the urging member when the temple is further rotated in a spreading direction from the state in which the first and second contact parts are in contact with each other.

The first contact part 15 has a nearly L shape projecting from the inner surface of the first cover part 5A in a direction along the X-axis with its end part bent toward the −Z-axis side as seen from the direction along the Y-axis (see FIGS. 6A and 6B).

Further, in the first contact part 15, the end of the part bent toward the −Z-axis side is formed to have a section nearly in an arc shape convex toward the −Z-axis side as seen from the direction along the Y-axis.

The pair of journal parts 13 are provided in the temple 6 as shown in FIG. 3 or 5.

Specifically, the pair of journal parts 13 are formed in nearly circular plate shapes projecting from the edge part of the second attachment hole 61 toward outside in parallel to the XZ plane and arranged in parallel along the Y-axis in the first temple part 6A.

Here, the separation dimension between the pair of journal parts 13 is set smaller than the separation dimension between the pair of support parts 12.

Further, the pair of journal parts 13 are located between the pair of support parts 12 via the first attachment hole 51 when the temple 6 is attached to the cover 5.

Furthermore, in the pair of journal parts 13, as shown in FIG. 5, insertion holes 131 into which the rotational shaft 11 is inserted are respectively formed.

These insertion holes 131 include track holes passing through the end of the part bent toward the −Z-axis side in the first attachment hole 51 (the contact position between the first attachment hole 51 and the second contact part 16 (FIG. 5)) and extending along the rotation direction around a hypothetical second axis VA (see FIGS. 6A and 6B) in parallel to the Y-axis when the temple 6 is attached to the cover 5.

Figure 7:
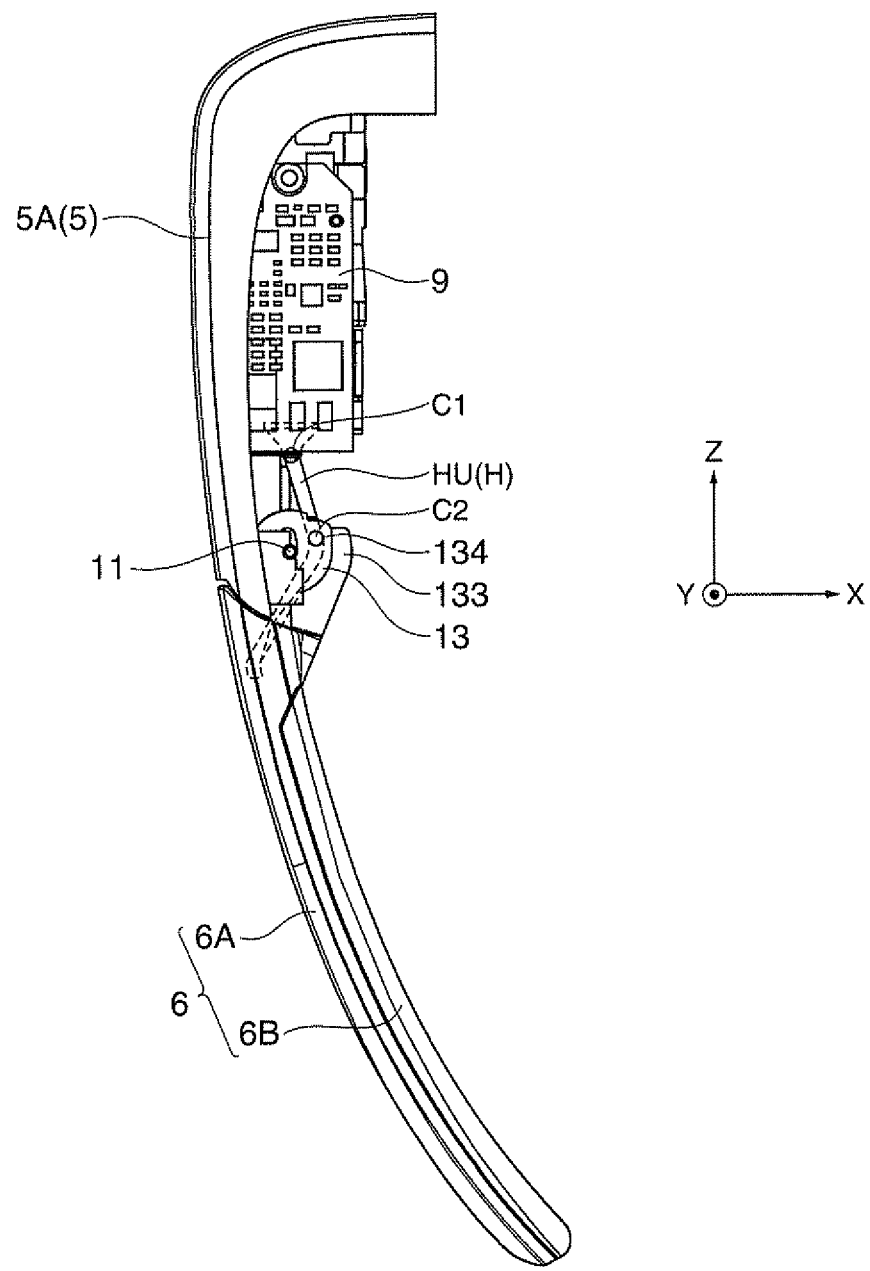
FIG. 7 is a diagram for explanation of a rotational operation of a U-shaped part in a harness when the temple is rotated in the embodiment.
Figure 8:
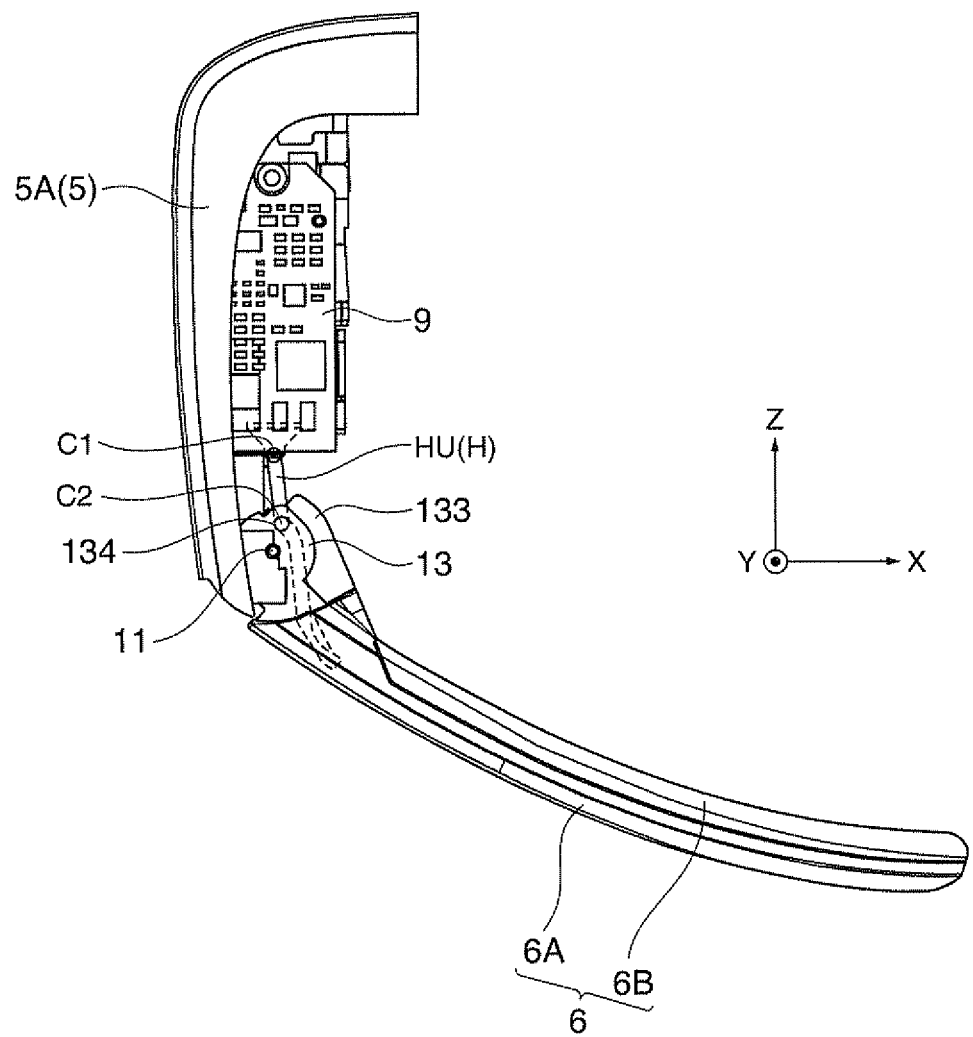
FIG. 8 is a diagram for explanation of the rotational operation of the U-shaped part in the harness when the temple is rotated in the embodiment.
Figure 9:
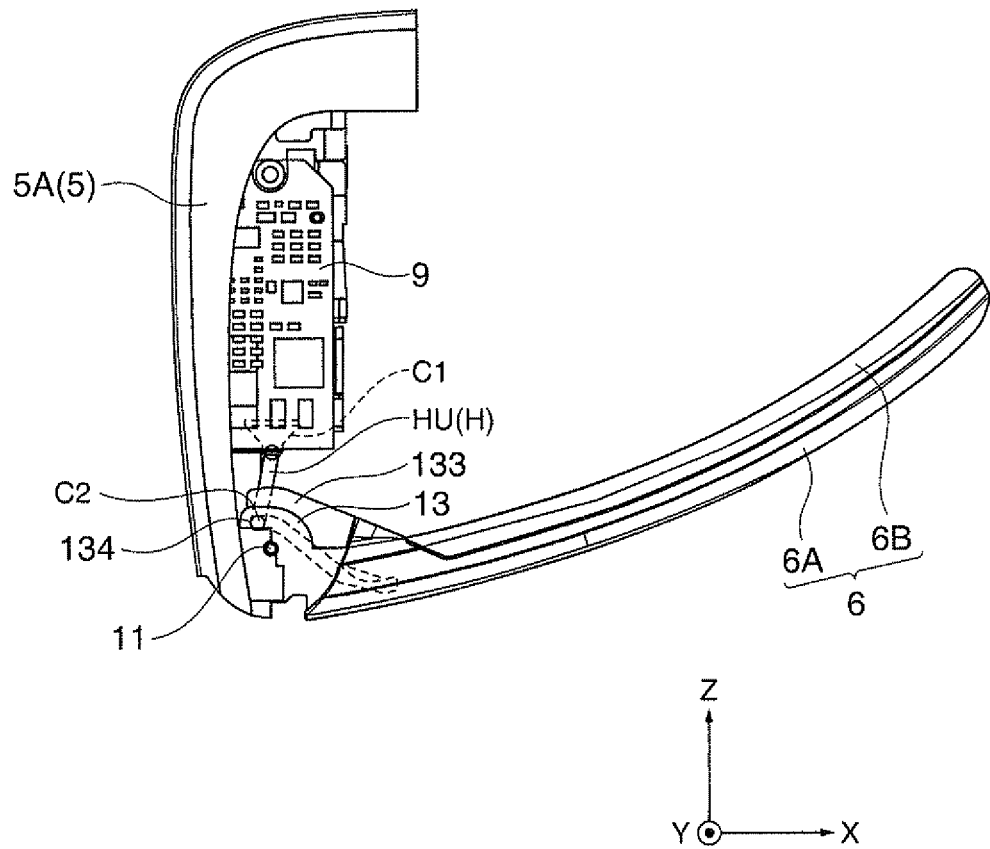
FIG. 9 is a diagram for explanation of the rotational operation of the U-shaped part in the harness when the temple is rotated in the embodiment.

Further, the temple 6 is attached to the cover 5 via the above-described hinge mechanism 10, and thereby, rotates around the rotational shaft 11 (the shaft along the Y-axis) in the spreading direction (the direction away from the other temple 6) and the closing direction (the direction closer to the other temple 6) (see FIGS. 7 to 9).

Here, in the temple 6, in the pair of journal parts 13, as shown in FIG. 5, the second contact parts 16 are respectively formed at the side away from the other temple 6 with respect to the insertion holes 131 as seen from the Y-axis direction.

The second contact part 16 is a part projecting from the outer edge of the journal part 13 and brought into contact with the first contact part 15 (the end of the part bent toward the −Z-axis side) when the temple 6 is rotated in the spreading direction.

Further, in the lower journal part 13, as shown in FIG. 5, a V-shaped cutout part 132 is formed at the side closer to the other temple 6 with respect to the insertion hole 131 as seen from the Y-axis direction.

The cutout part 132 is a part, when the first, second temple parts 6A, 6B are combined, forming a hole 134 into which the harness H is inserted between a pressing plate 133 (see FIGS. 7 to 9) formed in the second temple part 6B.

FIGS. 6A and 6B are diagrams for explanation of a function of the urging member 14. Specifically, FIGS. 6A and 6B are sectional views of the hinge mechanism 10 cut along the XZ plane. Further, FIG. 6A shows a state of the urging member 14 when the first and second contact parts 15, 16 are in contact with each other, and FIG. 6B shows a state of the urging member 14 when the temple 6 is further rotated in the spreading direction from the state in which the first and second contact parts 15, 16 are in contact with each other.

The urging member 14 includes a tension coil spring as shown in FIG. 3 or FIGS. 6A and 6B with one end and the other end attached to the rotational shaft 11 and the first temple part 6A, respectively, and urges the temple 6 toward the direction closer to the rotational shaft 11 (the direction closing the temple 6 (the direction closer to the other temple 6)).

Using the above-described urging member 14, the temple 6 rotates in the following manner.

That is, when the temple 6 rotates around the rotational shaft 11 in the spreading direction, the second contact part 16 is brought into contact with the first contact part 15 (FIG. 6A).

Further, when the temple 6 is pressed in the spreading direction from the state shown in FIG. 6A, the temple rotates around the second axis VA while changing the position of the rotational shaft 11 within the insertion hole 131 against the urging force by the urging member 14.

Therefore, the temple 6 exerts a predetermined force on the head of the observer with the urging force by the urging member 14 when the observer wears the virtual image display system 1.

8. Housing Condition of Harness H

Next, the housing condition of the harness H within the cover 5, the hinge mechanism 10, and the temple 6 will be explained.

One end side of the harness H connected to the circuit substrate 9 is routed from the circuit substrate 9 toward the −Z-axis side and bent by elastic deformation and housed in the first space Sp1 as shown in FIG. 3.

Specifically, the one end side of the harness H is bent by elastic deformation from the upper side at which the circuit substrate 9 is provided toward the lower side, and further bent by elastic deformation toward the upper side to have a U shape.

Further, the harness H bent toward the upper side in the first space Sp1 is inserted into the hole 134 (see FIGS. 7 to 9), and then, further bent by elastic deformation toward the −Z-axis side and routed into the second space Sp2 via the upper side of the pair of journal parts 13 as shown in FIG. 3.

Here, in the first temple part 6A, as shown in FIG. 3 or 5, a partition wall 63 that partitions the part between the pair of journal parts 13 into the upper side and the lower side is formed.

That is, the harness H is routed into the second space Sp2 via the upper journal part 13 and the partition wall 63.

Further, the harness H routed into the second space Sp2 is routed toward the −Z-axis side according to the shape of the second space Sp2 while being appropriately fixed within the temple 6, and led out via the lead-out hole 62 as shown in FIG. 3.

FIGS. 7 to 9 are diagrams for explanation of a rotational operation of a U-shaped part HU in the harness H when the temple 6 is rotated.

The U-shaped part HU has one end C1 side connected to the circuit substrate 9 and the other end C2 side inserted into the hole 134 as shown in FIGS. 7 to 9.

Further, when the temple 6 is rotated around the rotational shaft 11, the U-shaped part HU rotates around the one end C1 without distortion of the U shape with the rotation of the temple 6.

Note that, in the embodiment, as shown in FIGS. 7 to 9, the one end C1 of the U-shaped part HU and the rotational shaft 11 are set nearly along the Z-axis as seen from the direction along the Y-axis. Further, the U-shaped part HU is set to rotate within the range in which the part forms an acute angle with respect to the YZ plane with the rotation of the temple 6.

As above, the rotational operation of the U-shaped part HU when the temple 6 is rotated around the rotational shaft 11 has been explained, and the U-shaped part HU operates in the same manner even when the temple 6 is rotated around the second axis VA.

According to the above-described embodiment, there are the following advantages.

In the embodiment, the harness H is routed into the temple 6 (the second space Sp2) from inside of the cover 5 (the housing space Sp0, the first space Sp1) in which the circuit substrate 9 etc. are housed via the hinge mechanism 10 and led out from the lead-out hole 62 formed at the other end side of the temple 6.

According to the configuration, when the observer wears the virtual image display system 1, the harness H does not hit the face of the observer or bring a feeling of discomfort to the observer. That is, usability of the virtual image display system 1 may be improved.

Further, since the light guide plate 3 includes the image lead-in part 31, the total reflection part 32, and the image lead-out part 33, the observer may observe not only the images formed on the display device 7 but also external images, and the see-through virtual image display system 1 may be formed.

Furthermore, since the part of the harness H is bent by elastic deformation and housed in the first space Sp1, the load on the harness H in response to the rotation of the temple 6 may be reduced by the bending of the harness H and disconnection of the harness H may be prevented in good condition.

In addition, the U-shaped part HU is arranged to rotate with the rotation of the temple 6. In other words, the first space Sp1 is set to a size that may allow rotation without restriction of the rotation due to mechanical interference with the inner surface of the cover 5 or the like when the U-shaped part HU rotates with the rotation of the temple 6.

Accordingly, when the temple 6 rotates, the rotation of the U-shaped part HU is not restricted by the inner surface of the cover 5 or the like or no load is applied on the harness H, and disconnection of the harness H may be prevented in better condition.

Further, the position where the circuit substrate 9 is located and the position where the harness H passes through the hinge mechanism 10 are set at the upper side.

According to the configuration, oblique distortion of the U-shaped part HU may be prevented.

That is, it is difficult for the U-shaped part HU to mechanically interfere with the inner surface of the cover 5 or the like, it is not necessary to set the first space Sp1 to an unnecessarily large space, and the cover 5 and the virtual image display system 1 may be downsized.

Furthermore, since the part of the harness H housed in the first space Sp1 (U-shaped part HU) is bent and bowed in the vertical directions by elastic deformation, oblique distortion under its own weight may be prevented and the configuration that is hard to mechanically interfere with the inner surface of the cover 5 or the like may be realized.

In addition, since the hinge mechanism 10 has the above-described configuration, when the observer wears the virtual image display system 1, the temple 6 may be pressed toward the head of the observer with the predetermined force using the urging force by the urging member 14. That is, the temple 6 may be fitted with the head of the observer, and a feeling at the time when the observer wears the virtual image display system 1 may be improved.

Further, since the hinge mechanism 10 has the above-described configuration, the temple 6 may rotate around the second axis VA in addition to the rotation around the rotational shaft 11. That is, the rotation angle of the temple 6 is larger.

Even when the rotation angle of the temple 6 is larger as described above, because the part of the harness H (U-shaped part HU) is bent by elastic deformation and housed in the first space Sp1, disconnection of the harness H may be prevented in good condition.

Note that the invention is not limited to the above-described embodiment, but the invention includes modifications, improvements, etc. within the range in which the purpose of the invention may be achieved.

In the embodiment, in the virtual image display system 1, the image forming units 2 and the light guide plates 3 have been respectively provided in pairs corresponding to both eyes of the observer, however, not limited to those, of the pair of image forming units 2, one image forming unit 2 may be omitted for image observation by a single eye.

In the embodiment, the virtual image display system 1 has employed the transmissive liquid crystal display device 71, however, not limited to that, other configurations, for example, a reflective liquid crystal display device, a digital micromirror device, etc. may be employed.

In the embodiment, the lead-out hole 62 has been formed at the lower side of the other end in the temple 6, however, the formation position is not limited at the lower side of the other end as long as it may be formed in the temple 6.

In the embodiment, the part of the harness H has been bent in the U shape by elastic deformation and housed in the first space Sp1, however, the part may be bent not limited in the U shape but in other shapes as long as it may be bent by elastic deformation.

In the embodiment, the position where the circuit substrate 9 is located and the position where the harness H passes through the hinge mechanism 10 have been set at the upper side, however, not limited to those, they may be set at the lower side.

In the embodiment, the harness H is employed as the signal line, however, not limited to that, an FPC (Flexible Printed Circuits) or the like may be employed.

The invention may be used for a virtual image display system of a head-mounted display or the like.

The entire disclosure of Japanese Patent Application No. 2011-022229, filed Feb. 4, 2011 is expressly incorporated by reference herein.

What is claimed is:

1. A virtual image display system comprising:
   a display device that outputs image light;
   a circuit substrate that drives the display device based on an image signal;
   a signal line that is connected to the circuit substrate and inputs the external image signal to the circuit substrate;
   a projection lens that projects the image light from the display device, the projection lens having an optical axis;
   a light guide plate that takes in the image light from the projection lens, and then, guides the light to an external predetermined position, the light guide plate extending in a first longitudinal direction;
   a housing member having a housing space that houses the display device, the circuit substrate, and the projection lens, and a first space communicated with the housing space and housing a part of the signal line inside, the housing member extending in a second longitudinal direction, the second longitudinal direction extending in a same direction as the optical axis of the projection lens; and
   a temple rotatably attached to the housing member via a hinge mechanism and having a second space communicated with the first space via the hinge mechanism inside,
   the signal line is routed from the first space into the second space via the hinge mechanism, the part of the signal line is bent in a U-shaped part by elastic deformation and housed in the first space, the U-shaped art rotates in the first space with the rotation of the temple via the hinge mechanism with respect to the housing member, and the U-shaped part extends in a direction substantially perpendicular to the first longitudinal direction and substantially perpendicular to the second longitudinal direction.

2. The virtual image display system according to claim 1, wherein the light guide plate includes:
   an image lead-in part that is provided to face the projection lens and leads the image light from the projection lens into the light guide plate;
   a total reflection part that has a pair of total reflection surfaces formed in flat shapes orthogonal to an optical axis of the projection lens in parallel to each other, and guides the image light that has been led into the light guide plate in a direction away from the image lead-in part by total reflection on the pair of total reflection surfaces; and
   an image lead-out part that leads the image light that has been guided by the total reflection part to the external predetermined position.

3. The virtual image display system according to claim 1, wherein the circuit substrate is provided at one of an upper side and a lower side with respect to the display device and the projection lens within the housing space, and
   the signal line is routed from the first space toward the second space via the one of the upper side and the lower side in the hinge mechanism.

4. The virtual image display system according to claim 1, wherein the hinge mechanism includes:
   a rotational shaft that rotates the temple with respect to the housing member;
   a support part that is provided in the housing member and supports the rotational shaft;
   a journal part that is provided in the temple, has an insertion hole into which the rotational shaft is inserted, and is rotatably journaled by the rotational shaft; and
   an urging member bridged between the rotational shaft and the temple and urges the temple in a direction closer to the rotational shaft,
   wherein a first contact part and a second contact part that are in contact with each other when the temple is rotated against an urging force of the urging member are provided in the housing member and the temple, respectively, and
   the insertion hole includes a track hole passing through a contact position between the first contact part and the second contact part and extending in a rotation direction around a hypothetical second axis in parallel to the rotational shaft.

5. The virtual image display system according to claim 1, wherein the part of the signal line is bent by elastic deformation and housed in the first space.

6. The virtual image display system according to claim 5, wherein the part of the signal line is bent in a U-shape by elastic deformation and housed in the first space, and the U-shaped part rotates in the first space with the rotation of the temple via the hinge mechanism with respect to the housing member.

* * * * *